United States Patent [19]

Johnson et al.

[11] Patent Number: 5,063,698
[45] Date of Patent: Nov. 12, 1991

[54] GREETING CARD WITH ELECTRONIC SOUND RECORDING

[76] Inventors: Ellen B. Johnson; Daryl Ivey, both of 9925 NW. 25 Ave., Miami, Fla. 33147

[21] Appl. No.: 277,480

[22] Filed: Nov. 28, 1988

Related U.S. Application Data

[63] Continuation of Ser. No. 94,349, Sep. 8, 1987, abandoned.

[51] Int. Cl.$^5$ .............................................. G09F 1/00
[52] U.S. Cl. ..................................... 40/124.1; 40/455; 40/902
[58] Field of Search .................... 40/124.1, 455, 902; 206/232; 379/63, 88, 91, 144, 357; 340/825.34; 235/380, 381

[56] References Cited

U.S. PATENT DOCUMENTS

| | | | |
|---|---|---|---|
| 3,462,157 | 8/1969 | Barnett et al. | 274/9 |
| 4,222,188 | 9/1980 | Tarrant et al. | 40/152.1 |
| 4,299,041 | 11/1981 | Wilson | 40/902 |
| 4,531,310 | 7/1985 | Acson et al. | 40/1.5 |
| 4,541,188 | 10/1985 | Sadorus | 40/152.1 |
| 4,607,747 | 8/1986 | Steiner | 206/232 |
| 4,611,262 | 9/1986 | Galloway et al. | 206/232 |
| 4,677,657 | 6/1987 | Nagata et al. | 379/63 |
| 4,703,573 | 11/1987 | Montgomery et al. | 40/124.1 |

FOREIGN PATENT DOCUMENTS

| | | | |
|---|---|---|---|
| 2155858 | 10/1985 | United Kingdom | 40/455 |
| 8102215 | 8/1981 | World Int. Prop. O. | 40/455 |

Primary Examiner—Kenneth J. Dorner
Assistant Examiner—J. Hakomaki
Attorney, Agent, or Firm—Malloy, Downey & Malloy

[57] ABSTRACT

In one embodiment, the personalized greeting card includes an independent, detachable, electronic memory device that stores electronic signals, a mechanism for retrieving the electronic signals from the memory device, a voice synthesizer which obtains these electronic signals and produces audible sounds representative of the personalized message, and a switch that controls the retrieving device and the voice synthesizer. Prior to incorporating the memory device in the card, an EPROM translation machine converts the personalized message obtained from the sender of the card into appropriate electronic signals and stores those representative electronic signals in the memory device. The memory device is then detached from the EPROM and mounted in the circuitry disposed in the greeting card.

3 Claims, 1 Drawing Sheet

GREETING CARD WITH ELECTRONIC SOUND RECORDING

BACKGROUND OF THE INVENTION

The present invention relates to a greeting card with an electronic sound recording that embodies a personalized message for the recipient of the card.

Oftentimes, a greeting card is personalized with writings and pictures. The present invention advances this personalization of cards by delivering an audio message that is electronically embodied in circuitry that is carried within the greeting card.

U.S. Pat. No. 4,531,310 to Acson, et al. discloses a button or badge having a voice or sound synthesizer circuit 16 that is activated by closure of an appropriate switch. The audio sounds are embodied in a read only memory (ROM) integrated circuit in the voice or sound synthesizer circuit. The badge also includes a power source for the circuitry. However, Acson does not disclose utilizing a personalized message that is stored in the ROM integrated circuit. U.S. Pat. No. 4,607,747 to Steiner discloses a carton for gifts that includes an acoustic generator that is turned on when the carton is opened. U.S. Pat. No. 3,462,157 to Barnett, et al. discloses an audible greeting card. A sound strip is incorporated in the card and a movable means having a pickup needle is also incorporated within the card. When the pickup is moved by the recipient of the card over the sound strip, audible sounds are emitted by the card. U.S. Pat. No. 4,222,188 to Tarrant, et al. discloses a merchandise display. The display may include a wind-up musical reproduction device or a cassette tape player. A continuous loop tape is also disclosed in Tarrant, et al. U.S. Pat. No. 4,541,188 to Sadorus discloses a reflective audio assembly. Sadorus utilizes a tape machine embodied in a picture frame structure.

OBJECTS OF THE INVENTION

It is an object of the present invention to provide a personalized greeting card that emits audible sounds representative of a personalized message from the sender of the card to the recipient of the card.

It is another object of the present invention to provide a personalized greeting card wherein the personalized message is recorded as electronic signals in an electronic memory device.

It is a further object of the present invention to provide for the conversion of the personalized message as given by the sender of the card into electronic signals and storing those signals in an independent, detachable, electronic memory device.

SUMMARY OF THE INVENTION

In one embodiment, the personalized greeting card includes an independent, detachable, electronic memory device that stores electronic signals. Within the card is disposed circuitry that includes a retrieval mechanism for retrieving the electronic signals from the memory device, a voice synthesizer which obtains these electronic signals and produces audible sounds representative of the personalized message, and switch means that controls the retrieving device and the voice synthesizer. The memory device is mounted in the card with this circuitry. Prior to mounting the memory device in the card, the memory device is mounted in a carriage of an EPROM translation machine that converts the personalized message from the sender of the card into appropriate electronic signals and stores those representative electronic signals in the memory device.

BRIEF DESCRIPTION OF THE DRAWINGS

Further objects and advantages of the present invention can be found in the detailed description of t preferred embodiment when taken in conjunction w: the accompanying drawings in which.

DETAILED DESCRIPTION OF THE PREFERRED EMBODIMENT

The present invention relates to a greeting ca which carries an electronic embodiment of a person: ized message and which audibly announces the perso alized message when circuitry in the card is approp ately activated.

Figure 1:
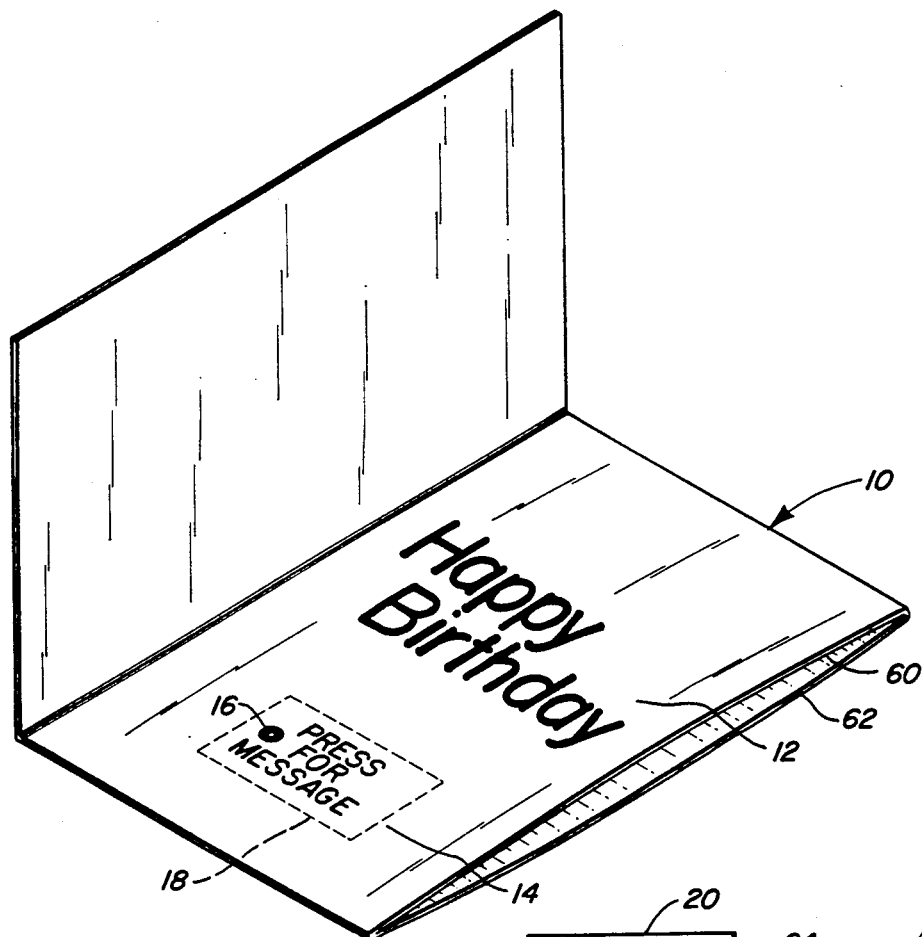
FIG. 1 illustrates a perspective view of the greeti card carrying electronic circuitry.

FIG. 1 shows a perspective view of greeting card having a central surface region 12 that contains indic representative of an appropriate greeting. These gre ings may be unique to the following events and sit: tions: Birthdays, Valentines Day, Mothers Day, Fathe Day, Christmas, Jewish holidays, Easter, Get W. Information, Friendship Information, Love and Affe tion Phrases, and others of similar purpose.

Card 10 has a secondary surface region 14 whit carries indicia instructing the recipient of the card press a switch 16 which activates an electronic circt 18 that is disposed in the interior of card 10. Upon d pression of switch 16, audible signals are emitted 1 circuit 18 representative of a personalized message fro the sender of the card to the recipient of the card.

Figure 2:
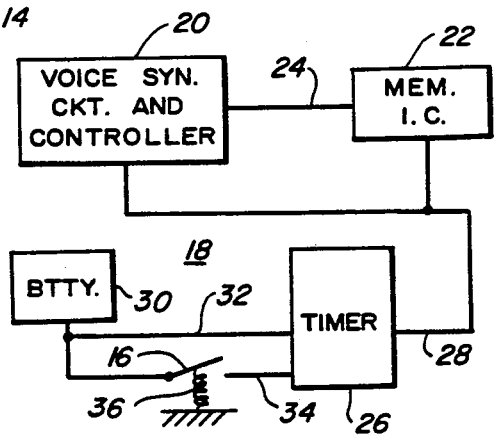
FIG. 2 illustrates, in block diagram form, the ele tronic circuitry carried by the greeting card; and, FIG. 3 illustrates, in block diagram form, electror circuitry used to convert the personalized message in electronic signals that are stored in the integrated c cuit memory device.

FIG. 2 shows, in block diagram form, electror circuit 18. The circuit includes a voice synthesizer c cuit and controller 20 that is coupled to memory int grated circuit 22 via data and control line 24. Both the circuits are coupled to a timer 26 via control and/ power line 28. Battery 30 is also part of circuit 18. O power line 32 runs directly to timer 26 and a secoi power line 34 extends between battery 30 and timer . but is interrupted by switch 16. Switch 16 is biased in : open position by spring 36 that is appropriate mounted to a support structure within card 10.

In operation, switch 16 is closed for a short peri( which activates timer 26. Timer 26 closes a switch t tween power line 32 and line 28 for a predetermin period of time thereby activating voice synthesiz circuit and controller 20 as well as memory integrat· circuit 22. Voice synthesizer circuit and controller . then retrieves electronic signals stored in memory . via data and control lines 24, converts the signals audible sounds and then emits the audible sounds th are representative of these stored electronic signals.

Figure 3:
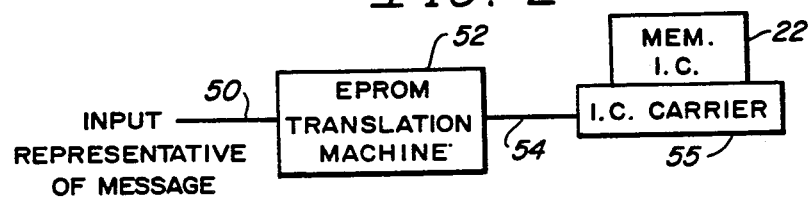

FIG. 3 illustrates the conversion of the personaliz( message to electronic signals that are stored in memo integrated circuit 22. An electrical input, representati· of the personalized message, is placed on input line 50 erasable programmable read only memory (EPRON translation machine 52. The EPROM translation m chine applies electrical signals on data and control li 54 to integrated circuit carrier 55. Memory integrated circuit 22 is plugged into carrier 55 and receives those electronic signals representative of the personalized message. EPROM 52 fixes the stored signals into memory 22 as is known to persons of ordinary skill in the art.

Memory integrated circuit 22 is then detached from carrier 55 and plugged into or attached to voice synthesizer and controller 20 as well as timer 26 as shown in FIG. 2. Electronic circuitry 18 is then placed intermediate layers 60 and 62 of card 10 such that switch 16 is disposed within secondary surface region 14 of the card.

In a preferred embodiment, the personalized message and personalized greeting card is developed as follows. The person wishing to send the greeting card calls a toll-free telephone number that connects the sender with a centralized location. At that centralized location, a telephone answering machine is programmed to give certain instructions and receive certain information from the sender relative to the personalized greeting card.

Initially, the instructions would inform the sender that they have reached the centralized location and inform the sender that at the first beep, the sender is to announce his name, address and telephone number for billing purposes. Lastly, the initial instructions would inform the sender not to hang up the telephone since further information is needed to produce the personalized greeting card. The telephone answering device would issue a beep and the answering machine would record the billing information on the sender of the greeting card.

After a predetermined period of time, a second group of instructions would be announced to the sender of the card. The second group of instructions would request the sender to give the card recipient's name, the recipient's address and request that the sender of the card identify what type of card he wishes to send, i.e., Birthday card, Christmas card, Mothers Day card, etc. The answer machine would then beep and begin recording that further information about the recipient of the greeting card.

A third set of instructions would then be announced to the sender of the greeting card after an appropriate time. This third set of instructions would give information about the length of the personalized message and other data about the message. The answer machine would then beep and the personalized message, as announced by the sender of the greeting card, would be recorded by the machine.

Lastly, a closing set of instructions would be given to the sender of the greeting card thanking the sender for using the services and asking for his return business.

Personnel at the central location could then utilize this data regarding the billing, the recipient's name and address, and the type of card to prepare an appropriate greeting card with the appropriate indicia at central surface region 12. More importantly, personnel at the central region would then convert the personalized message stored on the answer machine via EPROM 52 into representative electronic signals and store those representative signals in memory integrated circuit 22. Memory integrated circuit 22 is commonly a read only memory (ROM) device. The ROM is then detached from carrier 55 and inserted into electronic circuitry 18. Preferably, the personnel at the central location then checks circuitry 18 to insure that the personalized message has been properly recorded in ROM 22 and voice synthesizer and controller 20 is operating correctly. Circuit 18 is then placed in the interior of card 10 and the card is sent to the recipient as requested by the sender of the card.

The claims appended hereto are meant to cover modifications and changes within the scope and spirit of the present invention. For example, the electronic circuitry 18 shown in FIG. 2 is only exemplary. Timer 26 may be replaced by any type of device which limits the operating time of synthesizer/controller 20. The claims are meant to be so construed.

What I claim is:

1. The method of creating an individually personalized greeting card assembly including a carrier portion with an electronic sound recording embodying a personalized message, comprising the steps of:

communicating by telephone from a remote location with a programmed answering machine at a centralized location and establising a telephone circuit between the locations, said machine being programmed to provide spaced sets of outgoing messages and receive spaced sets of incoming messages, communicating from the centralized location to the remote location a first set of outgoing messages advising that upon a certain audible signal, the user should provide billing information including identity, address, and telephone number, recording said billing information provided by the user via telephone from the remote location at the centralized location, communicating a second set of instructions from the centralized location requesting information as to the identity and address of the intended recipient of the card, recording said recipient information provided by the user via telephone from the remote location at the centralized location, communicating a third set of instructions from the centralized location via telephone to the remote location advising the user of data about the type of message which can be provided upon an audible signal, recording the message given via telephone from the remote location to the centralized location, preparing an appropriate greeting card including the steps of:

converting said personalized message stored in the answering machine from an auditory state into representative electronic signals including inputing the electronic signals in an erasable programmable read-only translation means, processing the electronic signals in an integrated circuit carrier, and storing and fixing said electronic signals in a memory integrated circuit, detaching the memory integrated circuit and electrically connecting the memory integrated circuit in a circuit means including a voice synthesizer means, controller means, timer means, battery means, and a normally open switch means, and attaching said circuit means to said card assembly carrier portion with a switch means accessible for closing the circuit means.

2. The method as set forth in claim 1 including the step of delivering said card assembly to said recipient, closing the switch means, and converting the stored electronic signals into audible sounds representing the stored electronic signals and comprising the personalized message.

3. The method as set forth in claim 1 including the step of preparing a bill at the centralized location and forwarding same to the user of the method.

* * * * *